United States Patent

[11] 3,607,723

| [72] | Inventors | Reese A. Peck;<br>Raymond F. Wilson; Frank E. Guptill, Jr.,<br>all of Fishkill, N.Y. |
|------|-----------|---|
| [21] | Appl. No. | 811,604 |
| [22] | Filed | Mar. 28, 1969 |
| [45] | Patented | Sept. 21, 1971 |
| [73] | Assignee | Texaco Inc.<br>New York, N.Y. |

[54] SPLIT FLOW HYDROCRACKING PROCESS
10 Claims, No Drawings

[52] U.S. Cl. ..................................................... 208/59,
                                                             208/80
[51] Int. Cl. .......................................................C10g 13/00,
                                                             C10g 37/02
[50] Field of Search............................................ 208/59, 80

[56] References Cited
UNITED STATES PATENTS

| 3,186,935 | 6/1965 | Vaell............................. | 208/59 |
| 3,211,641 | 10/1965 | Halik et al. ................... | 208/59 |

*Primary Examiner*—Delbert E. Gantz
*Assistant Examiner*—R. M. Bruskin
*Attorneys*—K. E. Kavanagh and Thomas H. Whaley ABSTRACT: A hydrocracking process for the substantially complete hydrocracking of a heavy hydrocarbon charge stock by introducing a heavy hydrocarbon charge stock into a catalyst zone comprising a first catalyst zone below and a second catalyst zone above the point of entry of the charge stock, in the presence of hydrogen which is introduced in countercurrent relationship to said charge stock in first catalyst zone and maintained at a rate sufficient to provide for lower boiling liquid contact of the second catalyst zone followed by recycling the remaining hydrocarbon material from the first catalyst zone to the charge stock.

SPLIT FLOW HYDROCRACKING PROCESS

This invention relates to the catalytic hydrocracking of heavy hydrocarbon materials and more particularly to a hydrocracking process which produces substantially complete conversion of said heavy hydrocarbon materials to lower boiling hydrocarbons and selectivity in such conversion to lower boiling hydrocarbons which boil within a particularly preferred boiling range.

Catalytic treatment of heavy hydrocarbon materials at temperatures in the range of 500 to 850° F. and elevated pressures in the presence of hydrogen to effect hydrocracking is known in the prior art. In general, prior art hydrocracking practices involves heating a heavy hydrocarbon material to the desired reaction temperature and mixing therewith, either before or after heating, the desired amount of hydrogen followed by passing the mixture into the upper portion of a reactor or reactor section containing a bed of granular catalytic material. In the reactor, a liquid phase which is composed of the higher hydrocarbons from the feed containing dissolved or absorbed hydrogen passes downwardly through the reactor in contact with the catalyst together with the downflowing stream of hydrogen, e.g. a downflow process. Alternatively the liquid feed can be introduced near the top and the hydrogen introduced near the bottom of the reactor and the vapor phase portion of the feed stream, together with stripping hydrogen and hydrogen liberated from the feed stream, can move upwardly through the upper portion of the reactor (countercurrent gas-liquid flow process).

It is an object of this invention to provide for a hydroconversion process wherein substantially complete conversion to lower boiling hydrocarbons is obtained from the hydrocracking of heavy hydrocarbon materials.

It has now been found that substantially complete conversion of heavy hydrocarbon materials to lower boiling hydrocarbons can be accomplished in a split flow hydrocracking process which comprises introducing a heavy hydrocarbon charge stock in downward flow into a hydrocracking catalyst zone, said catalyst zone comprising a first catalyst zone below and a second catalyst zone above the point of entry of the heavy hydrocarbon charge stock, introducing hydrogen into said first catalyst zone in countercurrent relationship to the flow of said heavy hydrocarbon charge stock, maintaining a lower boiling liquid in the second catalyst zone, recovering a high boiling effluent from the first catalyst zone; recycling the high boiling effluent to the hydrocarbon charge stock and recovering lower boiling hydrocarbons from the second catalyst zone. It has been found that when a lower boiling liquid is maintained in the second catalyst zone and the effluent from the first catalyst zone is recycled to the heavy hydrocarbon charge stock, substantially complete conversion of the heavy hydrocarbon charge stock to lower boiling liquids is accomplished. In addition the conversion to lower boiling hydrocarbons is accomplished with selectivity in such conversion to lower boiling hydrocarbons which boil within a particularly preferred boiling range. Thus the amount of gaseous products such as methane and ethane which are formed during the process of this invention is small in comparison to the selective yield more of preferred lower boiling hydrocarbons. In addition, it has been found that the substantially complete conversion of a heavy hydrocarbon charge stock to lower boiling hydrocarbons does not result in any substantial buildup in the first catalyst zone of hydrocarbon materials boiling above 850° F. thus permitting substantially complete conversion and selectivity in such conversion of the charge stock to lower boiling hydrocarbons on a continuous basis. In general, conversion of a charge stock to hydrocarbons boiling below 850° F. of at least about 90% more preferably above 95% and still more preferably above 99% on a weight basis are obtained on a continuous basis. The recycle feature of this invention in addition provides, quite expectedly, a process which has low frequency of catalyst regeneration, low hydrogen consumption and substantial hydrocracking conversion at low hydrocracking temperatures.

In carrying out the process of this invention, the heavy hydrocarbon charge stock is introduced into a hydrocracking catalyst zone herein defined to include a first catalyst zone in downflow relationship to the downward flow of the heavy hydrocarbon charge stock, a second catalyst zone above the point of entry of the heavy hydrocarbon charge stock and in upflow relationship to the lower boiling hydrocarbons which proceed from the first catalyst zone into the second catalyst zone. By the use of the term "downward flow" is meant that the heavy hydrocarbon charge stock proceeds in downflow relationship to the first catalyst zone. By the use of the term "above" in reference to the second catalyst zone is meant only that the second catalyst zone is in upflow relationship to the flow of the hydrogen containing gas and in upflow relationship to the volatile hydrocarbon and entrained liquid hydrocarbon which proceed from the first catalyst zone into a second catalyst zone. The word "above" is used to define a flow relationship with the first catalyst zone, which relationship provides for the flow of hydrogen, volatile hydrocarbons and entrained lower boiling liquid hydrocarbons from the first catalyst zone in countercurrent relationship with the downward flow of the heavy hydrocarbon charge stock into a second catalyst zone. Thus, the second catalyst zone can be located directly in a space dimension sense above the first catalyst zone such as when the first and second catalyst zone are present in a vertical reactor with an intermediate point of entry for the heavy hydrocarbon charge stock. However this invention contemplates that the second catalyst zone can be present as a separate reactor which is connected to the first reactor by conduit means, although it is preferred in carrying out the process of this invention to use a vertical reactor wherein the first catalyst zone and second catalyst zone are present in the same reactor. Within the first and second catalyst zone is a catalyst which has hydrocracking activity under process conditions of temperature, pressure and space velocity which are utilized during the process. In addition, the catalyst in the first catalyst zone can be either the same or different than the catalyst present in the second catalyst zone.

The heavy hydrocarbon charge stock upon entry to the catalyst zone proceeds downwardly in downflow relationship to the first catalyst zone. Hydrogen is introduced into the first catalyst zone at the lower extremity and/or at intermediate points in said first catalyst zone in countercurrent relationship to the first catalyst zone and in upflow relationship to the second catalyst zone, the volatile hydrocarbons and the lower boiling liquid hydrocarbons hereinafter referred to as liquid proceed into the second catalyst zone. The volatile hydrocarbons and the liquids which are present in the second catalyst zone proceed from the second catalyst zone and are recovered by conventional means such as by cooling of the hydrocarbon vapors and liquid. The hydrogen which proceeds from the second catalyst zone can then be recycled together with fresh hydrogen into the first catalyst zone. In addition, hydrogen optionally can be blended with the heavy hydrocarbon charge stock and such charge stock can be introduced at ambient temperature or higher such as temperatures up to hydrocracking temperatures into the catalyst zone. The high boiling effluent from the first catalyst zone is then recycled to the heavy hydrocarbon charge stock.

As stated above, liquid is maintained in the second catalyst zone. In general, a liquid is maintained in the second catalyst zone by the rate of introduction of hydrogen into the first catalyst zone by any of the means set forth above for the introduction of hydrogen. In order to maintain liquid in the second catalyst zone utilizing hydrogen, it has been found that hydrogen gas rates of at least 3000 SCF per barrel of liquid feed preferably from 3000 SCF per barrel of liquid feed up to about 25,000 SCF per barrel liquid feed are required in the first catalyst zone. The hydrogen need not be pure and gases containing more than about 65 volume percent hydrogen may be used. In this connection, the term "hydrogen" is also intended to include dilute hydrogen, reformer byproduct hydrogen, hydrogen produced by the partial oxidation of hydrocarbon materials followed by shift conversion and electrolytic hydrogen. Thus hydrogen gas streams such as from catalytic reforming units wherein the hydrogen containing off gas from the reforming unit will contain impurities such as methane and ethane are satisfactory. The rates as set forth above pertain to the actual hydrogen gas rates which are introduced into the first catalyst zone to maintain liquid presence in the second catalyst zone.

The hold-up of the liquid hydrocarbon charge stock in the first catalyst zone can be varied somewhat by varying the upward flow of hydrogen. In general it is preferred to have high liquid hold-up that is a hold-up of hydrocarbon charge stock which provides for maximum catalytic effectiveness for the conversion of the charge stock to lower boiling hydrocarbons.

The lower boiling liquid which is maintained in the second catalyst zone in general is derived from the heavy hydrocarbon material, and in general is a lower boiling hydrocarbon which is present initially in the heavy hydrocarbon charge stock and/or which is formed in carrying out the process of this invention. In general the liquid material has a boiling point below 850° F. It is preferred that the liquid which is present in the second catalyst zone have at least about 90% by weight of the liquid boiling below 850° F. more preferably at least about 97% by weight and still more preferably at least about 99% by weight boiling below 850° F.

The process of this invention is utilized for the hydrocracking of heavy hydrocarbon charge stocks which term hydrocracking is herein defined to be destructive hydrogenation in which a substantial portion of the product boils at a temperature below that of the charged heavy hydrocarbon material. In general percent conversions by weight per single pass of the 850° F.+ material of the charge stock varies from about 15 to 80% more preferably from about 20 to 60%. The hydrocracking conditions as to pressure, temperature, space velocity, liquid recycle ratio and single per pass conversion can be varied over a wide range, those conditions which are utilized being those which produce substantially complete conversion of the heavy hydrocarbon charge stock to lower boiling hydrocarbons. As stated above the percent conversion on a single pass basis can be varied and that percent conversion is adjusted so that substantially complete conversion is accomplished through recycling of the high boiling effluent from the first catalyst zone. Thus depending upon the percent conversion the amount of effluent which is recycled will vary. In general recycle ratios of recycle effluent to hydrocarbon charge stock on a volume basis of from 0.25 to 1 to 2:1 more preferably from about 0.75:1 to 1.25:1 are preferred.

A wide variety of heavy hydrocarbon fractions and/or distillates can be used as a charge stock in the process of this invention. Such heavy hydrocarbon fractions include full range crude oils, topped or reduced crude oils, atmospheric distillates, vacuum tower bottoms, visbreaker bottoms product, heavy cycle stock from thermal or catalytically cracked charge stocks, etc. and blends of two or more of the above charge stocks. Particularly preferred heavy hydrocarbon charge stocks are deasphalted atmospheric and vacuum tower residues which have been topped to temperatures of at least 550° F. at atmospheric pressure, and those charge stocks and mixtures thereof which contain at least about 10 wt. % 850 F.+ hydrocarbon material more preferably about 25.

The first and second catalyst zone conditions that are utilized in the split flow process of this invention are in general temperatures of from about 600° F. to about 850° F., preferably from about 725° F., to about 840° F.; pressures of from about 500 to about 5000 p.s.i.g. preferably from about 1500 to about 2000 p.s.i.g. and liquid hourly space velocities of from about 0.05 to about 10, preferably from about 0.25 to about 2.5, volumes of feed per volume of catalyst per hour.

In general it is preferred to have approximately the same conditions in the first and second catalyst zone although the gas rates in the first and second catalyst zone will differ depending upon the amount of hydrogen which is blended together with the heavy hydrocarbon charge stock prior to the introduction into the catalyst zone and/or consumed in the process. Thus hydrogen gas rates in the second catalyst zone may be somewhat higher than the hydrogen rates in the first catalyst zone. In addition depending upon the percent conversion per single pass and the recycle ratio of effluent to heavy hydrocarbon charge stock which is utilized, different liquid hourly space velocities in the first and second catalyst zone can be used. In general the liquid hourly space velocity in the second catalyst zone will be greater than that in the first catalyst zone. In addition as in the case where the catalyst zones are not present in the same reactor, temperature and pressure can be varied and different.

The hydrocracking catalyst utilized for the conversion of the aforementioned hydrocarbon charge stocks can be crystalline metallic alumino-silicate zeolite, having a platinum group metal (e.g. platinum or palladium) deposited thereon or composited therewith. These crystalline zeolites are characterized by their highly ordered crystalline structure and uniformly dimensioned pores, and have an alumino-silicate anionic cage structure wherein alumina and silica tetrahedra are intimately connected to each other so as to provide a large number of active sites, with the uniform pore openings facilitating entry of certain molecular structures. It has been found that crystalline alumino-silicate zeolites, having effective pore diameter of about 6 to 15, preferably 8 to 15 Angstrom units, when composited with the platinum group metal, and particularly after base exchange to reduce the alkali metal oxide (e.g. $Na_2O$) content of the zeolite to less than about 10 wt. %, are effective hydrocracking catalyst, particularly for the hydrocarbon charge stocks herein contemplated.

In addition, the catalyst can be a supported hydrogenation catalyst comprising a Group VIII metal in the Periodic Table, such as nickel, cobalt, iron or one of the platinum group metals such as palladium, platinum, iridium, or ruthenium on a suitable support. Generally, it is preferred that an oxide or sulfide of a Group VIII metal (particularly iron, cobalt or nickel) be present in mixture with an oxide or sulfide or a Group VI–B metal (preferably molybdenum or tungsten). Suitable carriers or supports include acidic supports such as: silica-alumina, silica-magnesia, and other well-known cracking catalyst bases; the acidic clays; fluorided alumina; and mixtures of inorganic oxides such as alumina, silica, zirconia, and titania having sufficient acidic properties providing high cracking activity.

In addition the various metals and metal oxides and sulfides can be utilized on a mixture of support materials. Thus for example a zeolite and an alumina can be blended together as a support material in varying proportions which support materials contain various metals deposited thereon.

The invention can be better appreciated by the following nonlimiting examples.

EXAMPLE 1

San Ardo crude oil and a fluid catalytic cracker heavy cycle gas oil (FC HCGO) are blended in equal parts by volume to produce a charge stock used for evaluation of this process.

Properties of these stocks are shown below:

|  | San Ardo Crude | FC HCGO |
| --- | --- | --- |
| Gravity, °API | 12.6 | 22.6 |
| Carbon Residue, Wt. % | 9.4 | 0.46 |
| Sulfur, wt. % | 2.0 | 0.76 |
| Nitrogen, wt. % | 0.82 | 0.8 |
| Distillation, wt. % | | |
| Below 400° F. | — | — |
| 400°–650° F. | 16.6 | 40.0 |
| 650°–850° F. | 23.2 | 60.0 |
| 850–ED | 60.1 | — |

To a 1500 cc. split flow vertical pressure reactor equipped with charge stock inlet tube at the intermediate point in said reactor, effluent exit tubes at the bottom and top of the reactor, a gas tube at the bottom of the reactor, a first and second fixed screen catalyst bed containing 300 ccs. each of catalyst below and above the charge stock inlet tube respectively, the first catalyst beds containing a nickel oxide (3 wt. %), molybdenum oxide (13.6 wt. %) on alumina (⅛ inch pellets), and the second catalyst bed containing a nickel oxide (6 wt. %) tungsten oxide (19 wt. %) on a support comprising 22% low sodium zeolite, 56% silica and 22% alumina on a weight basis, and heating means is charged the above stock at a temperature of approximately 250° F. in downflow relationship to the first catalyst zone at a space velocity of volumes of liquid per volume of catalyst per hour of 1.0. A hydrogen gas is introduced through the gas inlet tube in countercurrent relationship to the charge stock at a rate of 12,000 SCF per barrel liquid feed, and a temperature of 775° F. and a pressure of 1500 p.s.i.g. are maintained in the first and second catalyst beds. The entire hydrocarbon bottoms from the first catalyst bed is continuously recycled to the reactor in admixture with fresh charge stock resulting in a hydrocarbon bottom to fresh feed recycle ratio on a volume basis of about 1.0. A product is recovered from the second catalyst zone through the effluent exit tube which has the following properties.

| Inspection Data | Charge Stock | Recycle Bottoms | Product |
|---|---|---|---|
| Gravity, °API | 17.2 | 13.0 | 27.0 |
| Nitrogen, p.p.m. | 5810 | 8000 | 846 |
| Sulfur, wt. % | 1.17 | 0.90 | 0.10 |
| Carbon Residue, wt. % | 5.35 | 11.28 | 0.001 |
| Hydrogen, wt. % | 11.2 | 10.5 | 12.0 |
| Carbon, wt. % | 86.1 | 86.6 | 86.8 |

| Yield Structure, wt. % | Charge Stock | Recycle Bottoms | Product |
|---|---|---|---|
| Dry Gas | — | — | 1.6 |
| C₄'s | 0 | 0 | 0.4 |
| C₅'s | 0 | 0 | 0.2 |
| C-₆–400° F. | 0.4 | 3.1 | 4.6 |
| 400°–650° F. | 27.0 | 4.4 | 45.5 |
| 650°–850° F. | 41.5 | 31.4 | 47.0 |
| 850° F.+ | 31.1 | 61.1 | 0.6 |

Total conversion of 850° F.+ fraction is verified by analysis of samples of the bottoms recycle stream taken periodically during a 485 hour run which shows no appreciable buildup of carbon residue. Per pass conversion of 850° F.+ components of the fresh feed stock is 33 weight % and hydrogen consumption over a 48 hour period was 400 SCF per barrel of feed.

EXAMPLE 2

To a reactor as described in example 1 wherein the first and second catalyst bed contained 300 ccs. each of a nickel oxide (3 wt. %), molybdenum oxide (13.6 wt. %) on alumina (⅛ inch) catalyst, is introduced a San Ardo Crude having the properties listed above in downflow relationship to the first hydrogenation catalyst bed at a liquid hourly space velocity of 1.2. A temperature of 750° F., a pressure of 1400 p.s.i.g. and a hydrogen circulation rate of 18,000 SCF per barrel liquid feed are maintained in the first and second hydrogenation catalyst beds. The high boiling bottoms are removed from the first catalyst zone and continuously recycled to the reactor in admixture to the fresh feed in a recycle ratio of volumes of high boiling hydrocarbon to fresh feed of 0.90. A product is recovered from the second catalyst zone which has less than 1.0 wt. % 850 F.+ material.

EXAMPLE 3

To a reactor as described in example 1 utilizing the same catalysts and charge stock as described in example 1, is introduced the charge stock in downflow relationship to the first hydrogenation catalyst bed at a liquid hourly space velocity of 1.0. A temperature of 775° F., a pressure of 1500 p.s.i.g. and a hydrogen circulation rate of 15,000 SCF per barrel liquid feed are maintained in the first and second hydrogenation catalyst beds. The high boiling bottoms are removed from the first catalyst zone and continuously recycled to the reactor in admixture to the fresh feed in a recycle ratio of volumes of high boiling hydrocarbon to fresh feed of 1.0 and a per pass conversion of 850° F.+ material on a weight basis of 50%. A product is recovered from the second catalyst zone which has no 850 F.+ material.

EXAMPLE 4

To a reactor as described in example 1 utilizing a first catalyst bed containing 300 ccs. of a nickel oxide (3 wt. %), molybdenum oxide (13.6 wt. %) on alumina (⅛ inch) catalyst and a second catalyst bed containing nickel sulfide (3.7 wt. %), molybdenum sulfide (18.1 wt. %) on a support comprising 22% low sodium zeolite 56% silica and 22% alumina on a weight basis, is introduced to a charge stock described in example 1, in downflow relationship to the first hydrogenation catalyst bed at a liquid hourly space velocity of 1.0. A temperature of 750° F., a pressure of 1400 p.s.i.g. and a hydrogen circulation rate of 18,000 SCF per barrel liquid feed are maintained in the first and second hydrogenation catalyst beds. The high boiling bottoms are removed from the first catalyst zone and continuously recycled to the reactor in admixture to the fresh feed in a recycle ratio of volumes of high boiling hydrocarbon to fresh feed of 1.0. A product is recovered from the second catalyst zone which has an API gravity of 27 to 29°.

EXAMPLE 5

To a reactor as described in example 1 utilizing a first and second catalyst bed containing 300 ccs. each of a nickel oxide, (3 wt. %) molybdenum oxide (13.6 wt. %) on alumina (⅛ inch) catalyst is introduced a Safaniya atmospheric reduced crude charge stock having the following properties:

| | |
|---|---|
| °API | 13.8 |
| Sulfur, wt. % | 4.4 |
| Nitrogen, wt. % | 0.31 |
| DPI Glask Dist., Wt. % | |
| IBP–400° F. | |
| 400°–650° F. | 1.5 |
| 650°–850° F. | 20.3 |
| 850–EP | 78.2 | in downflow relationship to the first hydrogenation catalyst bed at a liquid hourly space velocity of 1.0. A temperature of 775°F., a pressure of 1400 p.s.i.g. and a hydrogen circulation rate of 15,000 SCF per barrel liquid feed are maintained in the first and second hydrogenation catalyst beds. The high boiling bottoms are removed from the first catalyst zone and continuously recycled to the reactor in admixture to the fresh feed in a recycle ratio of volumes of high boiling hydrocarbon to fresh feed of 1.0. A product is recovered from the second catalyst zone which has less than 1.0 wt. % 850 F.+ material.

EXAMPLE 6

To a reactor as described in example 1 utilizing a catalyst as described in example 1 is introduced a blend on a 2 to 1 volume basis of the San Ardo crude and FC HCGO the properties of which are set forth in example 1 in downflow relationship to the first hydrogenation catalyst bed at a liquid hourly space velocity of 1.2. A temperature of 775° F., a pressure of 1400 p.s.i.g. and a hydrogen circulation rate of 15,000 SCF per barrel liquid feed are maintained in the first and second hydrogenation catalyst beds. The high boiling bottoms are removed from the first catalyst zone and continuously recycled to the reactor in admixture to the fresh feed in a recycle ratio of volumes of high boiling hydrocarbon to fresh feed of 1.0. A product is recovered from the second catalyst zone which has less than 1.0 wt. % of 850° F.+ material.

EXAMPLE 7

To a downflow reactor utilizing a catalyst and charge stock as described in example 1, is introduced hydrogen and the charge stock in downflow relationship to the catalyst is a liquid hourly space velocity of 0.5, a temperature of 775° F., a pressure of 1500 p.s.i.g. and a hydrogen gas rate of 12,000 SCF per barrel liquid feed. The hydrogen consumption rate over a 48-hour period is determined to be 1200 SCF per barrel of fresh feed, and the yield of products boiling below 400° F. is determined to be 20 wt. % at a 850° F.+ per pass conversion of 33 weight percent basis fresh feed.

The data present in examples 1 and 7 demonstrates the outstanding performance of the process of this invention for minimizing the amount of products such as dry gas and hydrocarbons boiling below 400° F. which are produced by the process of this invention that is 6.8 wt. % versus 20 wt. % for a downflow process. In addition, examples 1 and 7 demonstrate that the hydrogen consumption for the process of this invention based upon the same weight conversion for a single pass is approximately ⅓ that of a downflow process under the same conditions. Of additional importance are examples 1 through 3 wherein the amount of 850° F.+ material which is present in the product is extremely low and in many cases below 1.0 weight percent. Thus, the process of this invention provides for substantially complete conversion of 850° F.+ material to lower boiling products with selectivity in such conversion to hydrocarbons boiling within a preferred range. More particularly, example 1 demonstrates that approximately 92.5 wt. % of hydrocarbons boiling between 400° F. and 850° F. are produced in the process of this invention with 45.5 wt. % of products boiling between 400 and 650° F., a boiling range which is particularly preferred. In addition the process of this invention increases catalyst efficiency thereby requiring less frequent catalyst regeneration. This fact is of considerable importance in any process since catalyst regeneration can require loss of production of desired products. The above results obtained in the process of this invention versus a downflow process are even more significant since the conditions of the process of this invention are more severe than those conditions utilized in the downflow process, that is, the recycle of heavy hydrocarbon bottoms subjects the heavy hydrocarbon bottoms to additional hydrocracking. Thus the low yields of dry gas, the low hydrogen consumption and the extended catalyst life are even more significant when compared to the downflow prior art process.

While this invention has been described with respect to various specific examples and embodiments it is to be understood that the invention is not limited thereto and that it can be variously practiced within the scope of the following claims.

1. A split flow hydrocracking process for the substantially complete conversion of a heavy petroleum hydrocarbon charge stock to lower boiling hydrocarbons which comprises introducing a heavy hydrocarbon charge stock in liquid phase downward flow into a hydrocracking catalyst zone, said catalyst zone comprising a first hydrocracking catalyst zone below and a second hydrocracking catalyst zone above the point of entry of the heavy hydrocarbon charge stock maintaining said catalyst zone at a temperature between about 600 and 850° F. and a pressure between about 500 and 5000 p.s.i.g. introducing hydrogen into said first catalyst zone in countercurrent contact relationship to the flow of said heavy petroleum hydrocarbon charge stock at a rate of at least 3000 SCF per barrel of said charge stock to flow serially through said first and second hydrocracking catalyst zones thereby maintaining a lower boiling petroleum hydrocarbon liquid in the second catalyst zone, recovering a high boiling effluent from the first catalyst zone, recycling the effluent to the hydrocarbon charge stock and recovering lower boiling hydrocarbons from the second catalyst zone.

2. A process of claim 1 wherein the hydrogen gas rate is from 3000 SCF per barrel to about 25,000 SCF per barrel total liquid feed.

3. A process of claim 1 wherein the charge stock contains 850 F.+ hydrocarbons and the percent conversion by weight per single pass of 850 F.+ hydrocarbons is from about 15 to about 80.

4. A process of claim 1 wherein the charge stock contains 850 F.+ hydrocarbons and the percent conversion by weight per single pass of 850° F.+ hydrocarbons is from about 20 to about 60.

5. A process of claim 2 wherein the charge stock contains 850 F.+ hydrocarbons and the percent conversion by weight per single pass of 850 F.+ hydrocarbons is from about 20 to about 60.

6. A process of claim 1 wherein the ratio on a volume basis of high boiling effluent to heavy hydrocarbon charge stock is from about 0.25:1 to about 2:1.

7. A process of claim 2 wherein the ratio on a volume basis of high boiling effluent to heavy hydrocarbon charge stock is from about 0.25:1 to about 2:1.

8. A process of claim 4 wherein the ratio on a volume basis of high boiling effluent to heavy hydrocarbon charge stock is from about 0.75:1 to about 1.25:1.

9. A process of claim 1 wherein the lower boiling liquid has at least about 97% by weight of the liquid boiling below 850°F.

10. A process of claim 2 wherein the lower boiling liquid has at least about 97% by weight of the liquid boiling below 850°F.